(12) United States Patent
Kang

(10) Patent No.: US 7,172,287 B2
(45) Date of Patent: Feb. 6, 2007

(54) REFLECTIVE ILLUMINATING OPTICAL SYSTEM

(75) Inventor: Ho Joong Kang, Uijeongbu-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/816,998

(22) Filed: Apr. 2, 2004

(65) Prior Publication Data

US 2004/0196437 A1 Oct. 7, 2004

(30) Foreign Application Priority Data

Apr. 4, 2003 (KR) .................. 10-2003-0021271

(51) Int. Cl.
*G03B 21/14* (2006.01)
*G03B 21/28* (2006.01)
(52) U.S. Cl. .............................. 353/20; 353/31; 353/81
(58) Field of Classification Search .................. 353/20, 353/31, 33, 81
See application file for complete search history.

(56) References Cited

U.S. PATENT DOCUMENTS 6,183,090 B1 * 2/2001 Nakanishi et al. ............ 353/20
6,191,893 B1 * 2/2001 Bradley ....................... 359/634
6,439,724 B1 * 8/2002 Jeon et al. .................... 353/31
6,497,485 B1 * 12/2002 Itoh ............................. 353/20
6,980,260 B2 * 12/2005 Kato et al. .................... 353/31
2003/0072079 A1 * 4/2003 Silverstein et al. ........... 353/20
2003/0142276 A1 * 7/2003 English et al. ................ 353/31
2004/0184007 A1 * 9/2004 Silverstein et al. ........... 353/20
2004/0233393 A1 * 11/2004 Magarill et al. .............. 353/33

OTHER PUBLICATIONS

Arnold et al., "An Improved Polarizing Beamsplitter LCOS Projection Display Based on Wire_Grid Polarizers," SID 01 Digest, 1282-1285 (2001).*

* cited by examiner

*Primary Examiner*—Christopher Mahoney
(74) *Attorney, Agent, or Firm*—Lee, Hong, Degerman, Kang & Schmadeka

(57) ABSTRACT

A reflective illuminating optical system on silicon, more particularly, to an illuminating optical system is provided, in which R, G, and B signals reflected from a LCoS panel (Liquid Crystal on Silicon panel) in a projection system do not pass through wire grid type PBSs (Polarized Beam Splitters) but are reflected by the wire grid type PBSs (Polarized Beam Splitters) so that astigmatism is suppressed and illuminating efficiency is improved.

5 Claims, 8 Drawing Sheets

Screen     LCoS panel

Screen — LCoS panel

REFLECTIVE ILLUMINATING OPTICAL SYSTEM

BACKGROUND OF THE INVENTION

1. Field of the Invention

The present invention relates in general to a reflective illuminating optical system, more particularly, to a reflective illuminating optical system in which R, G, and B signals are reflected by wire grid type PBS (Polarized Beam Splitters) and incident on a projection lens, thereby suppressing astigmatism and improving illuminating efficiency.

2. Discussion of the Background Art

Display devices are becoming slimmer, lighter and have a large screen. Especially, a large screen display device is an ongoing subject in current display technologies. Projection TVs are typical examples of the large screen display device.

Projection TVs are largely classified into CRT (Cathode Ray Tube) projection TVs and LCD (Liquid Crystal Display) projection TVs. The LCD projection TV consists of a transmissive LCD-based system or reflective LCoS (Liquid Crystal on Silicon)-based system.

Particularly, the reflective LCoS, compared to the transmissive LCD, can be manufactured at low cost.

With reference to FIGS. 1 to 4, a related art projection system and illuminating system will now be discussed.

FIGS. 1 to 4 are schematic diagrams of a related art 3-panel reflective LCoS illuminating system.

As an example of an illuminating system for the related art reflective LCoS-based projection TV, FIG. 1 illustrates a reflective illuminating system with 3 PBSs (Polarized Beam Splitters). As shown in FIG. 1, a light emitted from a lamp 1 passes through a first dichroic mirror 2 via a condensing lens, where the first dichroic mirror 2 reflects red (R) and green (G) lights and transmits blue (B) light.

The reflected R and G lights pass through a second dichroic mirror 3 that reflects the G light and transmits the R light. After a transmission procedure, the R light is incident on first, second, and third PBSs 4a, 4b, and 4c in front of R, G, and B LCoS panels.

The incident R, G, and B lights on the respective $1^{st}$, $2^{nd}$, and $3^{rd}$ PBSs 4a, 4b, and 4c are reflected by the PBSs, and are incident upon a first, second, and third LCoS panels 5a, 5b, 5c, respectively. When the R, G, and B lights undergoes a phase change on the $1^{st}$, $2^{nd}$, and $3^{rd}$ LCoS panels 5a, 5b, and 5c, and are reflected by the LCoS panels. Then the reflected R, G, and B lights pass through the $1^{st}$, $2^{nd}$, and $3^{rd}$ PBSs 4a, 4b, and 4c.

Those transmitted R, G, and B lights are combined in an X-prism 6, and incident on a projection lens.

To be short, the above-described reflective illuminating system with 3 PBSs has a three-step process for guiding lights: a first step by the lamp 1, and the first dichroic mirror 2, a second step by the second dichroic mirror 3, the second LCoS panel 5b and the second PBS 4b, and a third step by the first and third LCoS panels 5a and 5c, the X-prism 6 and the first and third PBSs 4a and 4c. Because of this structure, the depth of the system is increased.

Moreover, the related art reflective LCoS illuminating system requires a number of elements, e.g., two dichroic mirrors, one mirror, a relay lens for correcting optical path differences of R, G, and B lights, three PBSs, and one X-prism and so forth.

Another example of a related art 3-panel reflective LCoS illuminating system in color quad system of FIG. 2 employs a color selector instead of the relay system.

The illuminating system of FIG. 2 uses a color selector to resolve the optical path differences of R, G, and B lights. That is, when a light emitted from a lamp 7 passes through a first color selector 8a, only a B light wave is changed to a S-wave (Secondary wave), and R and G light waves are outputted as P-waves (Primary waves).

When the light passes through a first PBS 9a, the S-wave is reflected and the P-waves are transmitted. The B light arrives at a second PBS 9b in front of an LCoS panel.

The B light is reflected by the second PBS 9b again, and incident on a third LCoS panel 10c. As the B light is reflected by the third LCoS panel 10c, the B light undergoes a phase change and passes through the second PBS 9b. Afterwards, the transmitted B light is incident on a fourth PBS 9d via a fourth color selector 8d.

On the other hand, the R and G lights are incident on a third PBS 9c through a second color selector 8b, the G light wave as a S-wave and the R light wave as a P-wave. The $3^{rd}$ PBS 9c reflects the G light and lets the R light pass through. Then, the G light is incident on a first LCoS panel 10a, and the R light is incident on a second LCoS panel 10b.

The incident G and R lights undergo a phase change at the $1^{st}$ and $2^{nd}$ LCoS panels 10a and 10b, and are incident again on the $3^{rd}$ PBS 9c where the G and R lights are combined. By a third color selector 8c, the polarization states of the G and R lights become equal, and the G and R lights in the same polarization state are incident on the $4^{th}$ PBS 9d.

When the R G, and B lights arrive at the $4^{th}$ PBS 9d, the lights are combined at the $4^{th}$ PBS 9d (i.e. the PBS usually performs either P/S separation or composition) and eventually incident on a projection lens.

Therefore, the 3-panel reflective LCoS illuminating system in color quad system has a two-step process for guiding lights, which is relatively simpler than the illuminating system in FIG. 1 where the relay system is provided. However, the illuminating system of FIG. 2 includes four color selectors and four PBSs, so it is not as cost-effective as expected.

In addition, when the PBS performs the P/S separation or composition, the input wave might be in a different polarization state as it is outputted (this phenomenon is called 'photoelasticity').

Introduced to solve the problems emerged from the related art illuminating optical systems of FIGS. 1 and 2 is an illuminating system with a wire grid type PBS as shown in FIG. 5. This new illuminating system is cost-effective, solves the photoelasticity problem, and improves illuminating efficiency by using a wide-angle illuminating light.

According to the operational principles of the illuminating system with the wire grid type PBS of FIG. 3, a light emitted from a lamp 11 passes through a first dichroic mirror 12a via a condensing lens. The first dichroic mirror 12a transmits R and G lights and reflects B light.

The transmitted R and G lights pass through a color selector 14, where the G light wave is changed to a S-wave, and the R light wave is changed to a P-wave, and are incident on a second wire grid type PBS 13b. The $2^{nd}$ wire grid type PBS 13b transmits the R light and reflects the G light. Later, the R light is incident on a first LCoS panel 15a and the G light is incident on a second LCoS panel 15b.

The G and R lights undergo a phase change at the $1^{st}$ and $2^{nd}$ LCoS panels 15a and 15b, and pass through a second dichroic mirror 12b via the $2^{nd}$ wire grid type PBS 13b, and eventually are incident on a projection lens.

Meanwhile, the B light reflected by the $1^{st}$ dichroic mirror 12a is reflected by a first wire grid type PBS 13a, and incident on a third LCoS panel 15c. At the $3^{rd}$ LCoS panel 15c, the B light undergoes a phase change, and passes through the 2$^{nd}$ dichroic mirror 12b via the 1$^{st}$ wire grid type PBS 13a, and eventually is incident on the projection lens.

FIG. 4 illustrates another example of a related art illuminating system with a wire grid type PBS. As shown in FIG. 4, a light emitted from a lamp 16 passes through a first dichroic mirror 17 via a condensing lens. The 1$^{st}$ dichroic mirror 17 reflects R and G lights and transmits B light.

The transmitted B light passes through a second relay lens 18b, a reflective mirror, a third relay lens 18c, and later arrives at a third wire grid type PBS 20c. The B light is reflected by the 3$^{rd}$ wire grid type PBS 20c and incident on a third LCoS panel 21c.

At the 3$^{rd}$ LCoS panel 20c, the incident B light undergoes a phase change and is reflected again. Finally, the B light is incident on an X-prism 22 via the 3$^{rd}$ wire grid type BPS 20c.

In the meantime, the R and G lights reflected by the 1$^{st}$ dichroic mirror 17 pass through a first relay lens 18a and is incident on a second dichroic mirror 19 where the R light is transmitted and the G lights is reflected.

The reflected G light is reflected by a second wire grid type PBS 20b and incident on a second LCoS panel 21b. At the 2$^{nd}$ LCoS panel 21b, the G light undergoes a phase change, and passes through the 2$^{nd}$ wire grid type PBS 20b, and eventually is incident on the X-prism 22.

The R light having been transmitted by the 2$^{nd}$ dichroic mirror 19 is reflected by a first wire grid type PBS 20a and incident on a first LCoS panel 21a. At the 1$^{st}$ LCoS panel 21a, the R light undergoes a phase change, and passes through the 1$^{st}$ wire grid type PBS 20a, and eventually is incident on the X-prism 22.

The incident R, G, and B lights are combined at the X-prism 22, and incident on the projection lens 23 later.

The wire grid type PBS in the above-described illuminating system has a homogeneous structure as illustrated in FIG. 5, and is formed on a glass plate.

Here, the size of wire grid type PBS on the glass plate has tens of nanometers.

Although the wire grid type PBS-based illuminating system successfully solved the photoelasticity and cost problems and improves illuminating efficiency, it caused astigmatism.

Astigmatism occurs in case the glass plate is inserted into a focusing lens at an oblique angle. Astigmatism is a phenomenon where a light is defocused at one side because a focal length in the horizontal direction is different from a focal length in the vertical direction.

Astigmatism gets worse especially when the light is reflected by the LCoS panel and then passes through the wire grid PBS.

Referring back to FIG. 3, the G light reflected by the 2$^{nd}$ LCoS panel 15b passes through the 2$^{nd}$ wire grid type PBS 13b, and the B light reflected by the 2$^{nd}$ LCoS panel 15c passes through the 1$^{st}$ wire grid type PBS 13a.

Also as shown in FIG. 4, the reflected light from the 1$^{st}$, 2$^{nd}$, and 4$^{th}$ LCoS panels 21a, 21b, and 21c pass through the 1$^{st}$, 2$^{nd}$, and 3$^{rd}$ wire grid type PBSs 20a, 20b, and °c.

Therefore, when the reflected light from the LCoS panel passes through the wire grid type PBS, astigmatism gets much worse. More details on this phenomenon are provided with reference to FIGS. 6 to 8.

FIG. 6 is a schematic diagram illustrating the layout of a projection lens in case a light passes through a wire grid type PBS; and FIGS. 7 and 8 illustrate the surface of a wave having the same phase.

A simulator is employed to observe aberration characteristics in a case where a wire grid type PBS 50 is inserted at an oblique angle between a screen and an LCoS panel.

FIGS. 7 and 8 show aberration characteristics when, as shown in FIG. 6, the light passes through the wire grid type PBS 50 that is insured at an oblique angle between a projection lens and the LCoS panel.

In other words, astigmatism occurs when the light passes through the wire grid type PBS 50 that is inserted at an oblique angle between a projection lens and the LCoS panel.

The following summarizes several problems of the related art reflective illuminating system.

First of all, the 3-step structure for the optical path in the reflective illuminating system with 3 PBSs of FIG. 1 increases the depth of the system and requires too many elements.

Although the reflective illuminating system in color quad system of FIG. 2 simplified the entire structure, it still includes four color selectors and PBSs, resulting in the high price.

When the PBS performs P/S separation and combination of lights, an input wave might have different components of polarization as the wave is outputted (this phenomenon is called 'photoelasticity').

The reflective illuminating system with the wire grid type PBS as shown in FIGS. 3 and 4 solved the problems in relation to photoelasticity, high cost of manufacture, and poor illuminating efficiency. However, when the light passes through the wire grid type PBS, astigmatism occurs.

Astigmatism may be suppressed by manufacturing the wire grid type PBS slimmer or arraying two-wire grid type PBSs in different directions. However, when the wire grid type PBS to be inserted is too thin, the PBS itself gets bent. Also, arraying the PBSs in different directions is not much effective for canceling astigmatism but creates circular shaped spots in large sizes. Further, because the angle between two PBSs is too large, it is impossible to construct the illuminating system overall.

SUMMARY OF THE INVENTION

An object of the invention is to solve at least the above problems and/or disadvantages and to provide at least the advantages described hereinafter.

Accordingly, one object of the present invention is to solve the foregoing problems by providing a reflective illuminating optical system, in which R, G, and B signals reflected by an LCoS panel of a projection system do not pass through wire grid type PBSs (Polarized Beam Splitters) but are reflected by the PBSs and eventually are incident on a projection leans, whereby astigmatism is suppressed and illuminating efficiency is improved.

The foregoing and other objects and advantages are realized by providing a reflective illuminating optical system, including: a first dichroic mirror for receiving a light emitted from a lamp, polarization components of the light being arrayed in one direction, and transmitting B (Blue) light and reflecting G (Green) and R (Red) lights; a second dichroic mirror for receiving the light whose optical path is separated, and transmitting the R light and reflecting the G light; first, second, and third wire grid type PBSs (Polarized Beam Splitters) for transmitting the R, G, and B lights, respectively, first, second, and third LCoS (Liquid Crystal on Silicon) panels for changing a phase of respective lights transmitted through the first, second, third wire grid type PBSs, and reflecting the phase changed lights; and an X-prism for receiving the R, G, and B lights that are reflected twice by the first, second, and third LCoS panels first, followed by the first, second, and third wire grid type PBSs, and combining the R, G, and B lights and permitting the combined lights to incident on a projection lens.

To increase contrast effects, first, second, and third polarization plates for polarizing the R, G, and B lights are inserted in between the X-prism and the first, second, and third wire grid type PBSs.

Another aspect of the invention provides a reflective illuminating optical system, including: a lamp for emitting a light; dichroic mirrors for receiving the light emitted from the lamp and separating B (Blue) light, G (Green) light, and R Red) light whose polarization components being arrayed into respective optical paths; first, second, and third LCoS (Liquid Crystal on Silicon) panels for changing a phase of the respective B, G, and R lights; first, second, and third wire grid type PBSs (Polarized Beam Splitters) for transmitting the lights that are separated into respective optical paths by the dichroic mirror, and reflecting the lights whose phases are changed at the first, second, and third LCoS panels; and an X-prism for combining the respective R, G, and B lights reflected by the wire grid type PBSs and permitting the combined lights to incident on a projection lens.

In an exemplary embodiment, a polarization plate is formed between the X-prism and each of the wire grid type PBSs.

In an exemplary embodiment, at least one relay lens is formed on an optical path that the B, G, or R light passes through.

In an exemplary embodiment, the dichroic mirrors include: a first dichroic mirror for transmitting the B light and reflecting the R light; and a second dichroic mirror for transmitting the R light out of the transmitted G and R lights, and reflecting G light out of the transmitted G and R lights.

In an exemplary embodiment, the wire grid type PBS is a film type.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a reflective illuminating optical system according to a preferred embodiment of the invention in reference to the accompanying drawings.

Figure 9:
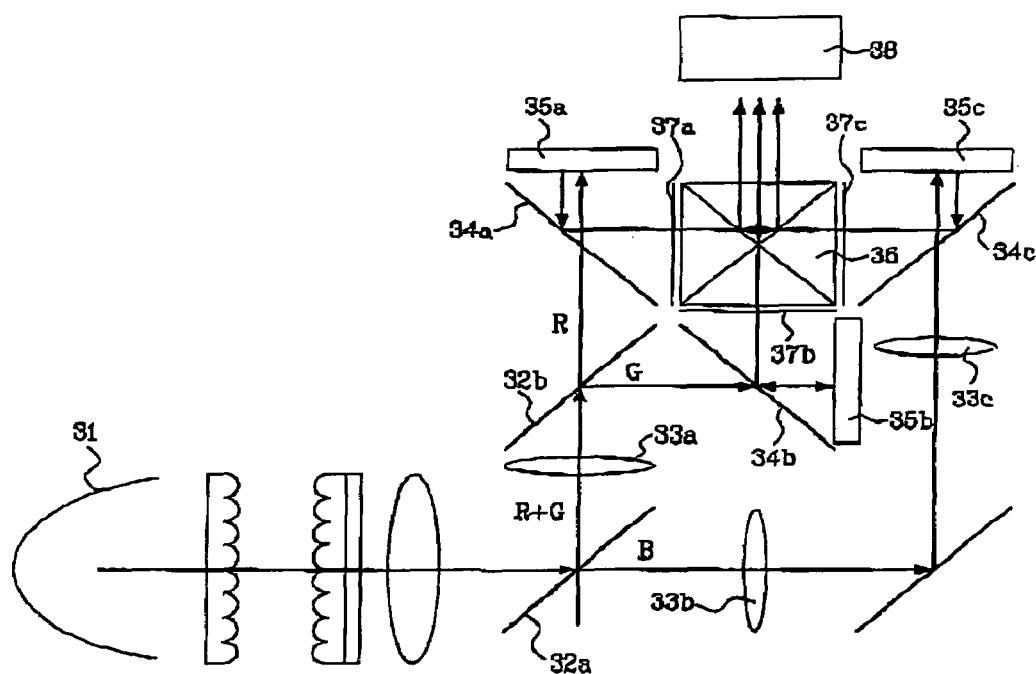
FIG. 9 is a schematic diagram of a reflective illuminating optical system according to the present invention.

FIG. 9 is a schematic diagram of a reflective illuminating optical system according to the present invention.

The present invention is related to a projection display device based on a reflective panel LCoS (Liquid Crystal on Silicon) for example. A new 3-panel reflective illuminating system according to the present invention employs wire grid type PBSs and improves performances, and can be manufactured at low cost.

In the reflective illuminating optical system of the invention all R, G, and B lights reflected from the LCoS panel do not pass through the wire grid type PBS but are reflected therefrom. As a result, no astigmatism occurs.

The above result is obtained by employing a polarization film functioning as the wire grid type PBS (i.e. the polarization film performs P/S separation and combination). In other words, by using a polarization film as the wire grid type PBS, deterioration of contrast and low intensity of radiation caused by a photoelasticity phenomenon in a related art PBS are no longer observed.

Unlike the related art PBS, the wire grid type PBS of the invention is capable of performing the P/S separation and combination even at a low F/#, which consequently increases the brightness. Also, to improve the contrast effect of incident lights on the projection lens, in which the incident lights had been reflected by the polarization film functioning as the wire grid type PBS prior to being incident on the projection lens, a polarization plate is inserted in between an X-prism and the wire grid type PBS.

Here, 'F/#' means an angle of an illuminating light. Therefore, the less the value of the F/#, the greater the angle of the illuminating light. More light can be received if the illuminating angle is great.

As depicted in FIG. 9, the reflective illuminating optical system according to the present invention includes a lamp 31 for emitting a light; a first dichroic mirror 32a for receiving the light whose polarization components are arrayed in one direction after transmission through a PCS (Polarization Converting System) and transmitting B (Blue) light and reflecting G (Green) and R (Red) lights; a second dichroic mirror 32b for receiving the reflected yellow (G+R) light through a first relay lens 33a and transmitting the R light and reflecting the G light; a second wire grid type PBS 34b for transmitting the G light reflected by the $2^{nd}$ dichroic mirror 32b to a second LCoS panel 35b; a first wire grid type PBS 34a for transmitting the R light transmitted through the $2^{nd}$ dichroic mirror 32b to a first LCoS panel 35a; a third wire grid type PBS 34c for transmitting the B light, the B light having been transmitted through the $1^{st}$ dichroic mirror 32a and incident on a third relay lens 33c via a second relay lens 33b and a third relay lens 33c; an X-prism for combining the R, G, and B lights, the R, G, and B lights having been reflected by the $1^{st}$, $2^{nd}$, and $3^{rd}$ LCoS panels 35a, 35b, and 35c and reflected by the $1^{st}$, $2^{nd}$, and $3^{rd}$ wire grid type PBSs 34a, 34b, and 34c , respectively, and permitting the combined light to incident on a projection lens 38; and first, second, and third polarization plates 37a, 37b, and 37c for polarizing each of the R, G, and B lights to increase contrast of the lights before they are incident on the X-prism 36.

To elaborate operational principles of thusly-structured reflective illuminating optical system of the invention, a yellow (G+R) light that is first reflected by the $1^{st}$ dichroic mirror 32a is incident on the $2^{nd}$ dichroic mirror 32b, more specifically the green dichroic mirror. Then the G light is reflected by the $2^{nd}$ dichroic mirror 32b and passes through the $2^{nd}$ wire grid type PBS 34b and is incident on the $2^{nd}$ LCoS panel 35b. The R light transmitted through the $2^{nd}$ dichroic mirror 32b passes through the wire grid type PBS 34a and is incident on the $1^{st}$ LCoS panel 35a.

Meanwhile, the B light transmitted through the $1^{st}$ dichroic mirror 32a passes through the $3^{rd}$ wire grid type PBS 34c via the relay lenses 33b and 33c, and is incident on the $3^{rd}$ LCoS panel 35c.

Therefore, the incident R, G, and B lights on the $1^{st}$, $2^{nd}$, and $3^{rd}$ LCoS panels 35a, 35b, and 35c are reflected by the $1^{st}$, $2^{nd}$, and $3^{rd}$ LCoS panels 35a, 35b, and 35 c, and these reflected lights are again reflected by the $1^{st}$, $2^{nd}$, and $3^{rd}$ wire grid type PBSs 34a, 34b, and 34c that are arrayed in front of the $1^{st}$, $2^{nd}$, and $3^{rd}$ LCoS panels 35a, 35b, and 35c, respectively. Afterwards, the R, G, and B lights are incident on the X-prism 36.

Preferably, the R, G, and B lights go through the $1^{st}$, $2^{nd}$, and $3^{rd}$ polarization plates 37a, 37b, and 37c before being incident on the X-prism 36. This is done in order to increase contrast effects of the R, G, and B lights reflected from the $1^{st}$, $2^{nd}$, and $3^{rd}$ wire grid type PBSs 34a, 34b, and 34c.

Accordingly, the reflective illuminating optical system of the invention does not cause any malfunction in optical performances, and has a structure for accommodating a plate shape optical element the wire grid type PBS for example so that the problems like deterioration of contrast and low intensity of radiation caused by the photoelasticity phenomenon observed in the related art PBS do not exist.

The follow will describe astigmatism characteristics of the reflective illuminating optical system according to the present invention.

Figure 10:
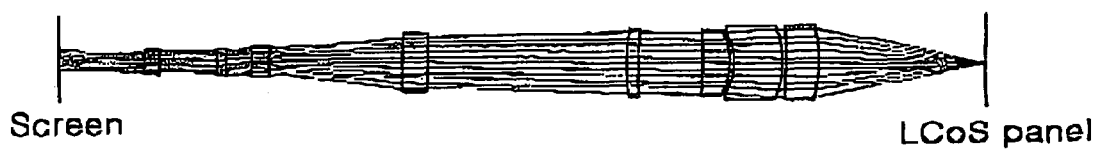
FIG. 10 is a schematic diagram illustrating the layout of a projection lens in a case that a light reflected from an LCoS panel does not pass through a wire grid type PBS but is reflected by the PBS.
Figure 11:
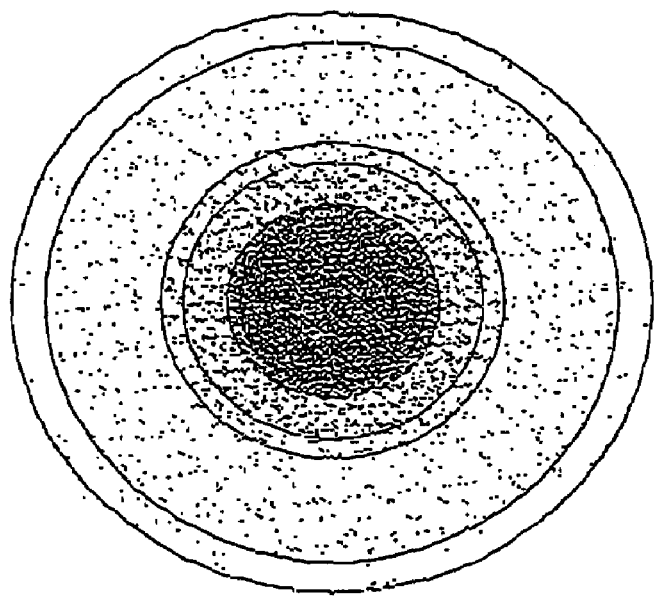
FIG. 11 and FIG. 12 show aberration characteristics observed in light waves in case of FIG. 10.
Figure 11:
Figure 12:
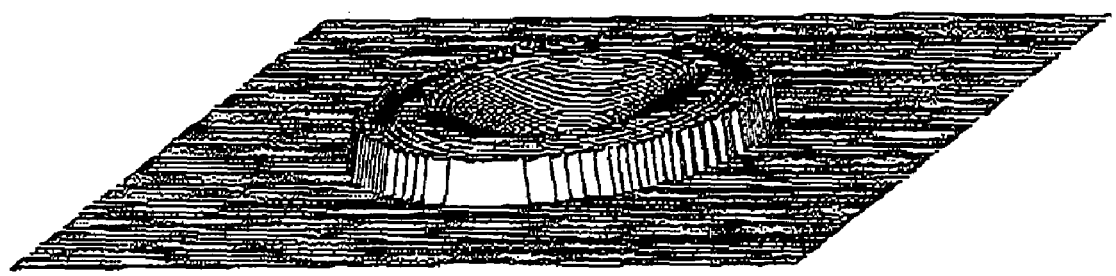

FIG. 10 is a schematic diagram illustrating the layout of the projection lens in a case that a light reflected from the LCoS panel does not pass through the wire grid type PBS but is reflected by the PBS; and FIG. 11 and FIG. 12 show aberration characteristics observed in light waves in case of FIG. 10.

Figure 1:
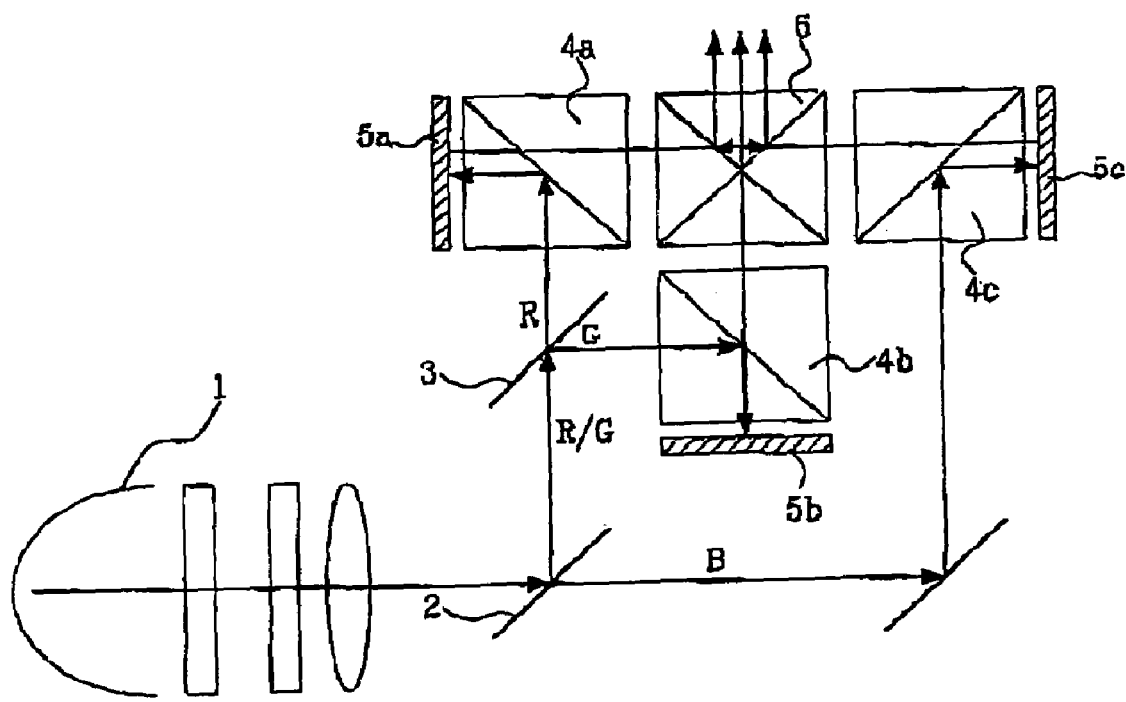
FIGS. 1 to 4 are schematic diagrams of a related art 3-panel reflective LCoS (Liquid Crystal on Silicon) illuminating system.
Figure 2:
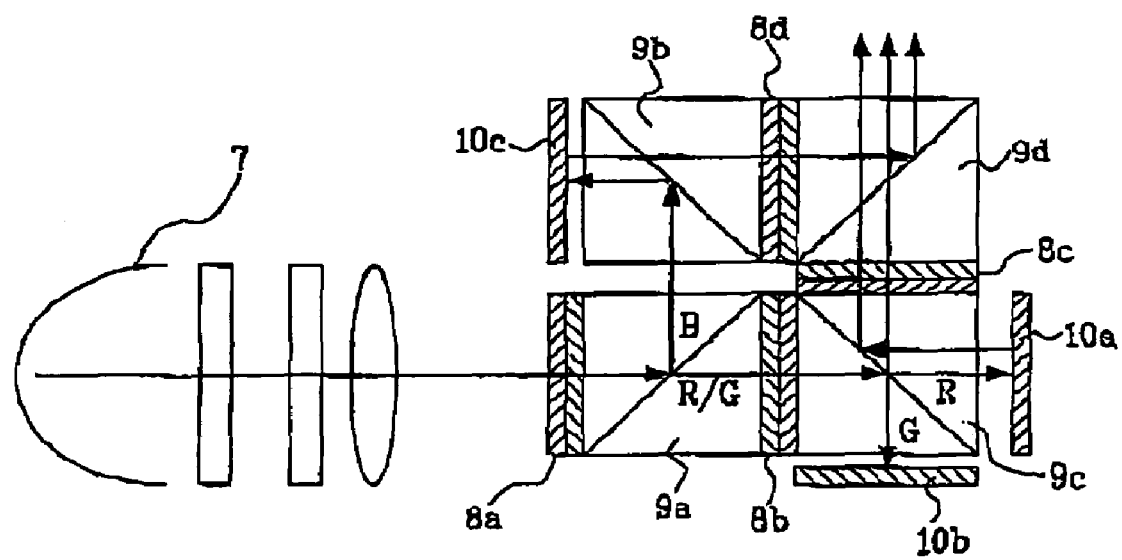
Figure 3:
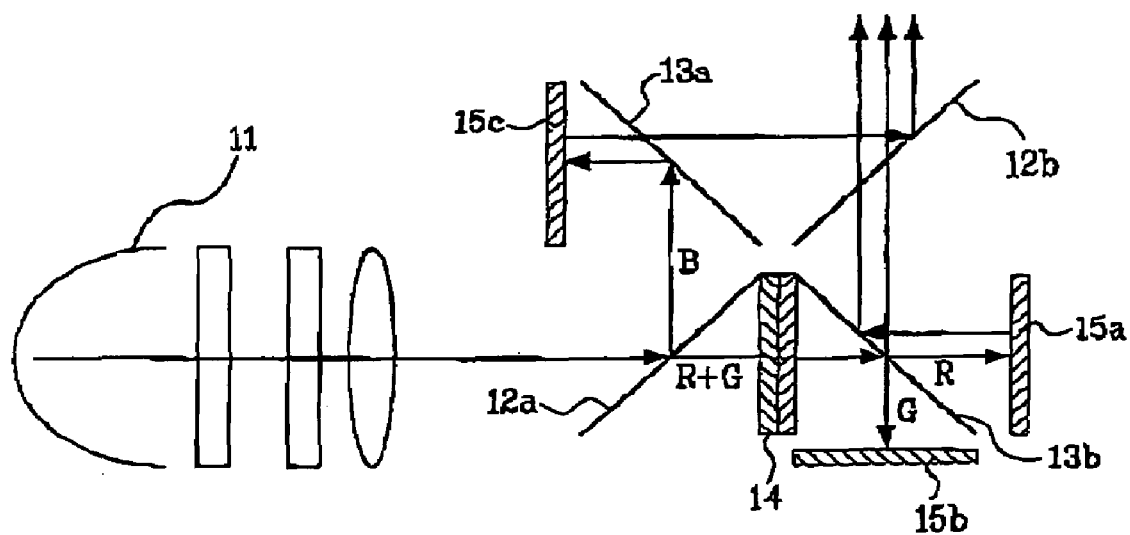
Figure 4:
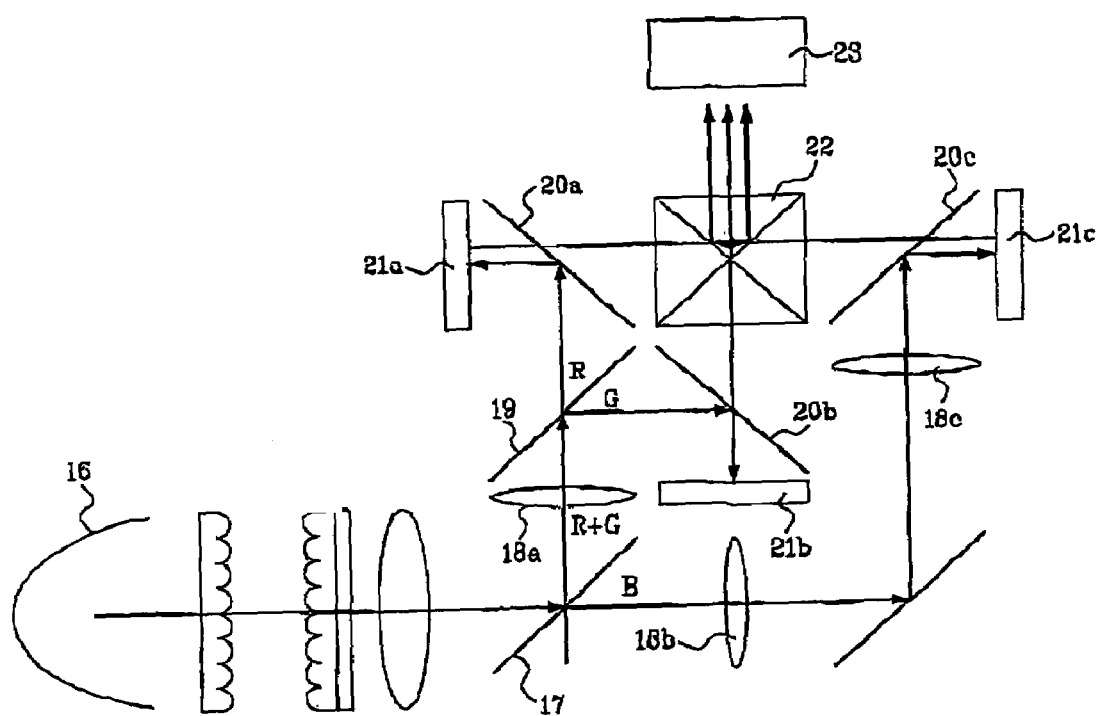
Figure 5:
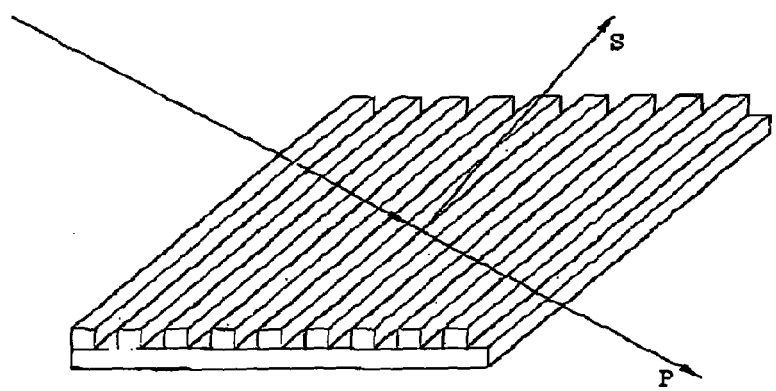
FIG. 5 illustrates a related art wire grid type PBS (Polarized Beam Splitter)
Figure 6:
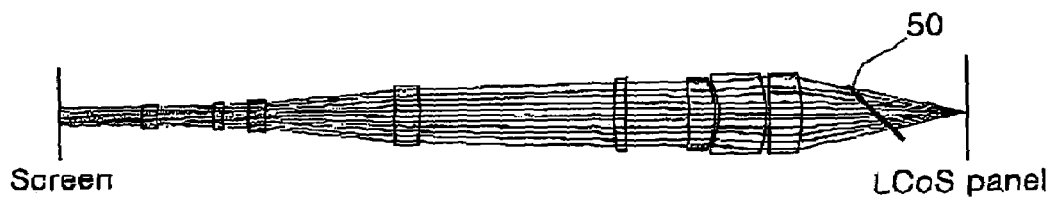
FIG. 6 is a schematic diagram illustrating the layout of a projection lens in an illuminating system with a related art wire grid type PBS.
Figure 7:
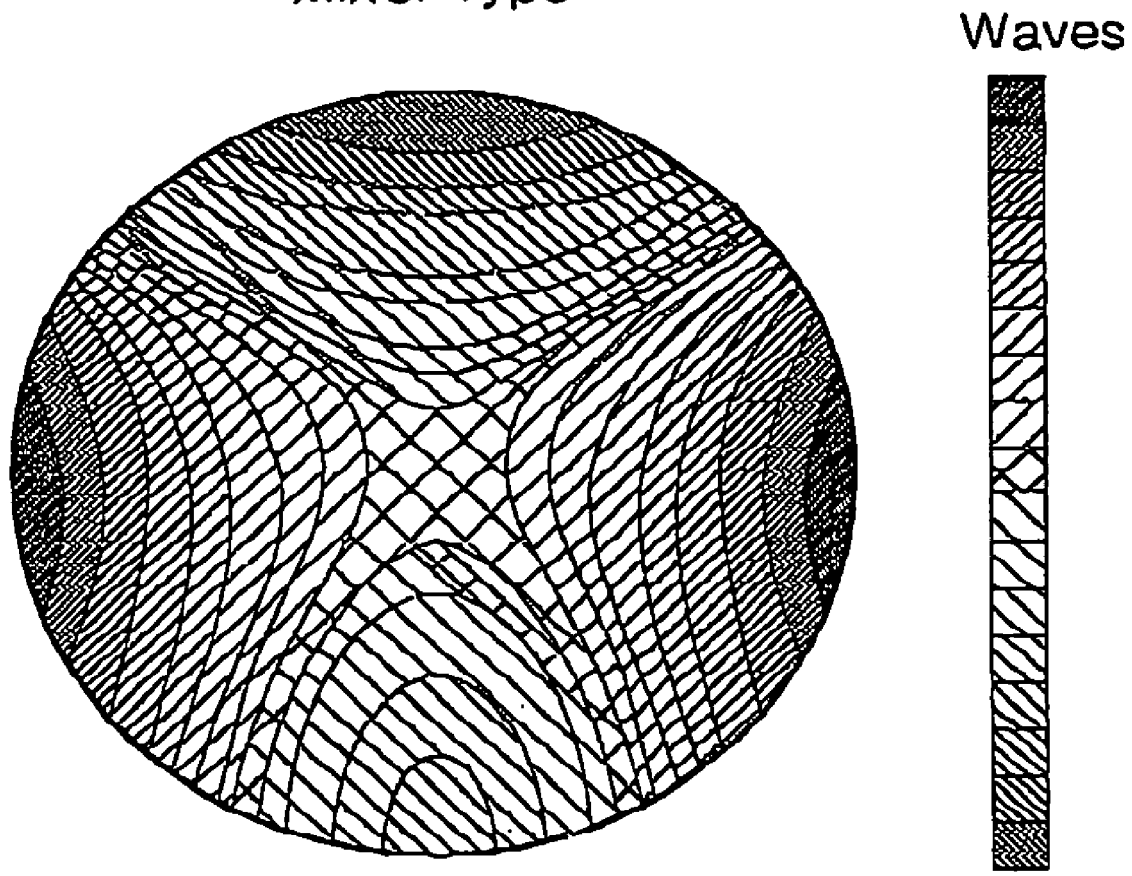
FIG. 7 and FIG. 8 show aberration characteristics observed in light waves in case of FIG. 6.
Figure 8:
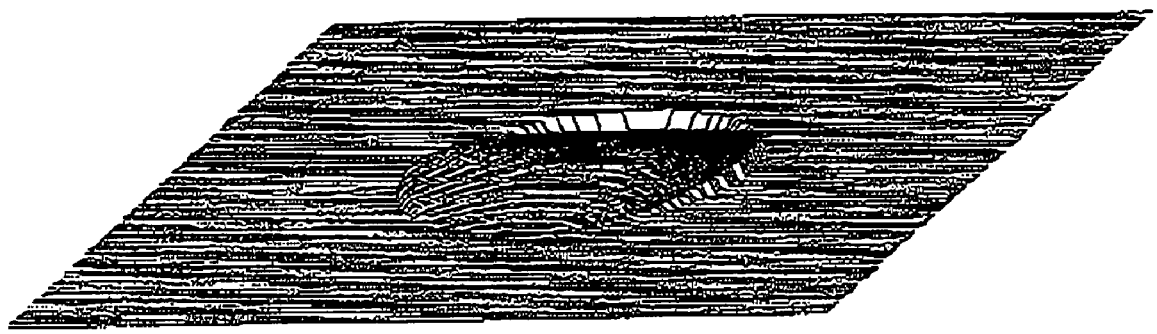

Compared with the aberration characteristics shown in FIGS. 6 to 8, it is evident in FIGS. 11 and 12 that astigmatism does not occur if the reflected light from the LCoS panel does not pass throw the wire grid type PBS but is reflected therefrom.

In other words, to get rid of astigmatism, the reflected light from the wire grid type PBS should be reflected by the LCoS panel and then incident on the projection lens, as it does in the reflective illuminating optical system according to the invention.

Moreover, the structure of the illuminating optical system can be more stabilized and is not easily bent by making the wire grid type PBS thicker. It turned out that the performances of the illuminating optical system are not affected by the thick wire grid type PBS.

In conclusion, the reflective illuminating optical system of the invention has the following advantages.

The photoelasticity phenomenon does not occur because of the wire grid type PBS employed in the 3-panel reflective optical system.

By inserting polarization plates between the X-prism and the wire grid type PBSs, the P/S separation and combination can also be performed at low values of the F/# and the contrast of the incident light on the projection lens is much improved.

Moreover, no astigmatism occurs because the light is reflected by the wire grid type PBS and then incident on the projection lens.

Compared to the related art systems with large depth, where optical paths are guided by the 3-step or 2-step process and many elements are required, the present invention has a simplified structure and is more cost-effective.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is invention is intended to be illustrative, and not to limit the scope of the claims. Many alternative, modifications, and variations will be apparent to those skilled in the art. In the claims, means-plus-function clauses are intended to cover the structures described herein as performing the recited function and not only structural equivalents but also equivalent structures.

What is claimed is:

1. A first illuminating optical system, comprising:
   a first dichroic mirror for receiving a light emitted from a lamp, polarization components of the light being arrayed in one direction, and transmitting B (Blue) light and reflecting G (Green) and R (Red) lights;
   a second dichroic mirror for receiving the light, whose optical path is separated, and transmitting the R light and reflecting the G light;
   first, second and third film type PBSs (Polarized Beam Splitters) for transmitting the R, G, and B lights, respectively;
   first, second, and third LCoS (Liquid Crystal on Silicon) panels for changing a phase of respective lights transmitted through the first, second, and third film type PBSs, and reflecting the phase changed lights, and
   an X-prism for receiving the R, G, and B lights that are reflected twice by the first, second, and third LCoS panels first, followed by the first, second, and third film type PBSs, and combining the R, G, and B lights and permitting the combined lights to incident on a projection lens.

2. The reflective illuminating optical system according to claim 1, wherein to increase contrast effects, first, second, and third polarization plates for polarizing the R, G, and B lights are inserted in between the X-prism and the first, second, and third film type PBSs.

3. A reflective illuminating optical system, comprising:
   a lamp for emitting a lights;
   dichroic mirrors for receiving the light emitted from the lamp and separating B (Blue) light, G (Green) light, and R (Red) light whose polarization components being arrayed into respective optical paths;
   first, second, and third LCos (Liquid Crystal on Silicon) panels for changing a phase of the respective B, G, and R lights;
   first, second, and third film type PBSs (Polarized Beam Splitters) for transmitting the lights that are separated into respective optical paths by the dichroic mirror, and reflecting the lights whose phases are changed at the first, second, and third LcoS panels; and an X-prism for combining the respective R, G, and B lights reflected by the film type PBSs and permitting the combined lights to incident on a projection lens;

wherein the dichroic mirrors comprise a first dichroic mirror for transmitting the B light and reflecting the G light and the R light and a second dichroic mirror for transmitting the R light out of the transmitted G and R lights, and reflecting the G light out of the transmitted G and R lights.

4. The reflective illuminating optical system according to claim 3, wherein a polarization plate is formed between the X-prism and each of the film type PBSs.

5. The reflective illuminating optical system according to claim 3, wherein at least one relay lens is formed on an optical path that the B, G, or R light passes through.

* * * * *